United States Patent [19]

Fox

[11] E Patent Number: Re. 33,527

[45] Reissued Date of Patent: Jan. 29, 1991

[54] TRASH COMPACTOR

[75] Inventor: Anthony Fox, Minneapolis, Minn.

[73] Assignee: TFC Corporation, Minneapolis, Minn.

[21] Appl. No.: 433,973

[22] Filed: Nov. 9, 1989

Related U.S. Patent Documents

Reissue of:

[64] Patent No.: 4,152,035
Issued: May 1, 1979
Appl. No.: 867,131
Filed: Jan. 5, 1978

[51] Int. Cl.[5] ..... B30B 15/06; B30B 15/04

[52] U.S. Cl. ..... 100/53; 100/215; 100/229 A; 100/240; 100/245

[58] Field of Search ..... 100/229 A, 229 R, 215, 100/240, 242, 245

[56] References Cited

U.S. PATENT DOCUMENTS

| | | | |
|---|---|---|---|
| 1,311,955 | 8/1919 | Edison . | |
| 2,330,165 | 9/1943 | Wykes . | |
| 2,355,675 | 8/1944 | Pryor et al. . | |
| 2,763,973 | 9/1956 | Atkins . | |
| 3,159,098 | 12/1964 | Dedekam et al. | 100/215 |
| 3,200,859 | 8/1965 | Parker, Jr. | 100/215 X |
| 3,501,890 | 3/1970 | Hunt . | |
| 3,721,060 | 3/1973 | Quinto | 100/215 X |
| 3,727,546 | 4/1973 | McKinney | 100/229 A |
| 3,728,959 | 4/1973 | Fredrickson | 100/245 X |
| 3,748,820 | 7/1973 | Fox | 100/229 A X |
| 3,754,500 | 8/1973 | Heth | 100/53 X |
| 3,772,984 | 11/1973 | Karls et al. | 100/53 X |
| 3,779,157 | 12/1973 | Ross, Jr. et al. | 100/240 |
| 3,808,967 | 5/1977 | Fair et al. | 100/53 X |
| 3,827,348 | 8/1974 | Hennels | 100/53 |
| 3,831,513 | 8/1974 | Tashman | 100/53 X |
| 3,855,919 | 12/1974 | Potter | 100/53 X |
| 3,889,589 | 6/1975 | Jackson et al. | 100/229 A X |
| 3,903,790 | 9/1975 | Gladwin | 100/229 A X |
| 3,945,314 | 3/1976 | Hennels | 100/53 |
| 3,986,757 | 10/1976 | Smith et al. | 100/229 A X |
| 4,007,677 | 2/1977 | Fox | 100/53 X |
| 4,008,658 | 2/1977 | Stock | 100/53 |
| 4,041,856 | 8/1977 | Fox | 100/245 X |
| 4,121,399 | 10/1978 | Verville . | |
| 4,127,062 | 11/1978 | Egosi | 100/245 X |
| 4,703,229 | 2/1978 | O'Rourke | 100/229 A X |

FOREIGN PATENT DOCUMENTS

| | | | |
|---|---|---|---|
| 2294831 | 7/1976 | France | 100/53 |
| 1201391 | 8/1970 | United Kingdom . | |

OTHER PUBLICATIONS

Sales Brochure, International Dynetics Corporation, Model 5500, no date.

*Primary Examiner*—Harvey C. Hornsby
*Assistant Examiner*—Stephen F. Gerrity
*Attorney, Agent, or Firm*—Moore & Hansen

[57] ABSTRACT

A cabinet for a trash or refuse compactor having a recessed area formed in the inside surfaces of its side and rear panels and extending upward from the floor thereof for a predetermined distance, the depth and size of the recess in the side and rear panels being such that the vertical sides of a box-type container may be disposed completely within the recess so as to avoid contact with a descending compaction plate.

7 Claims, 2 Drawing Sheets

TRASH COMPACTOR

Matter enclosed in heavy brackets [ ] appears in the original patent but forms no part of this reissue specification; matter printed in italics indicates the additions made by reissue.

BACKGROUND OF THE INVENTION

I. Field of the Invention

This invention relates generally to trash compacting apparatus for industrial, commercial and/or residential use, and more specifically to the features of the cabinet structure whereby the compacted trash may be collected in a box-type container for ease of disposal.

II. Description of the Prior Art

Available on the market and disclosed in the Patent Literature are a wide variety of machines for compacting trash and refuse. For example, in the Fredrickson U.S. Pat. No. 3,728,959, there is disclosed a baler apparatus which is mounted in a box-like cabinet having a top, a floor, and side and rear panels extending therebetween, and a generally open front with access doors for closing same. The cabinet is functionally divided into three compartments, although there is no physical barriers between these compartments. These three compartments may conveniently be referred to as a "machine compartment", a "trash receiving compartment", and a "compaction compartment". The machine compartment is generally disposed at the top of the cabinet and the compaction compartment at the bottom with the trash receiving compartment being located therebetween. In the baler of the Fredrickson Patent, when the machine is actuated, a hydraulic cylinder causes a generally planar, horizontally disposed compaction plate to move downward through the trash receiving compartment and into the compaction compartment such that trash disposed therein is compressed. Provision is made in the structure of the Fredrickson Patent for facilitating the wrapping of a baling wire around the compressed bale.

While the above described baling structure may be suitable for baling paper, cardboard or other dry materials, it is generally not suitable for handling trash including moist garbage or other fluid containing refuse.

There are also available in the prior art refuse compactors which are suited to the handling of liquid containing refuse and they generally solve the problem by utilizing a waterproof container into which the loose trash is compacted. As an example, reference is made to the Hunt U.S. Pat. No. 3,501,890. It is to be noted, however, that if one were to attempt to utilize a preformed carton in the baler apparatus of the Fredrickson Patent, during the downward stroke of the compaction plate thereof, the container would be at least partially torn and crushed.

SUMMARY OF THE INVENTION

In accordance with the present invention, there is provided a cabinet structure whose side and rear panels have a recess formed therein in the area defined by the "compaction compartment" such that a fluid impervious rectangular box-like carton may be disposed within the cabinet with its side walls wholly contained within the recesses formed in the side and rear panels. Thus, during the downward stroke of the compaction plate, the vertical sides of the container to not interfer with the path of travel of the compaction plate. As such, the container is not crushed or otherwise damaged.

Then too, it has been found that when the refuse being compacted includes tin cans and the like, there is a tendency for the crushed cans to become wrapped about the peripheral edges of the compaction plate during its compression stroke. When an attempt is made to return the compaction plate to its upward disposition, the presence of the crushed metal trash will tend to cause binding between the cabinet panels and the compaction plate, especially when a cabinet design such as illustrated in the Fredrickson Patent is involved. However, in the cabinet design of the present invention which includes the aforementioned recessed areas in the side and rear panels, as the platen or compaction plate moves upward, the metal refuse engages the bevel defining the recessed areas in the side panels and the metal refuse is stripped free from the platen.

OBJECTS

It is accordingly the principal object of the present invention to provide a new and improved cabinet structure for a trash compactor.

Another object of the invention is to provide a trash compactor cabinet which is adapted to receive a box-type receptacle therein such that moisture laden refuse may be compacted without the normal attendant mess.

Still another object of the invention is to provide a cabinet structure for a trash compactor in which a box-type trash receptacle may be inserted and which is outside of the path of travel of the compaction plate during its compression stroke.

A still further object of the invention is to provide a novel cabinet structure for a trash compactor which precludes binding of the compaction plate with the sides of the cabinet.

These and other objects and advantages of the invention will become apparent during the course of the following description when considered in light of the accompanying drawings in which like numerals in the several views refere to corresponding parts.

DESCRIPTION OF THE PREFERRED EMBODIMENT

Figure 1:
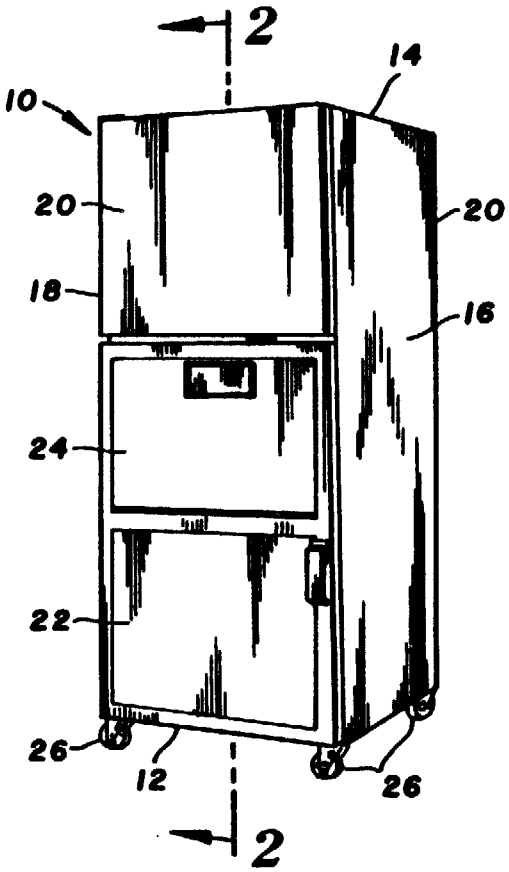
FIG. 1 is a perspective view of the preferred embodiment.

Referring first to FIG. 1, the trash compactor cabinet of the present invention is indicated generally by numeral 10. It includes a base plate 12, a top panel 14, a right side panel 16, a left side panel 18 and a rear panel 20. These panels are joined to form a generally rectangular parallelepiped of a predetermined length, width and height. Hingedly secured to the front edge of the left side panel 18 are first and second access doors 2 and 22, the access door 22 further including a hingedly mounted trash filling door 24. The cabinet 10 may be mounted on castors as at 26—26 to facilitate the repositioning thereof.

Figure 3:
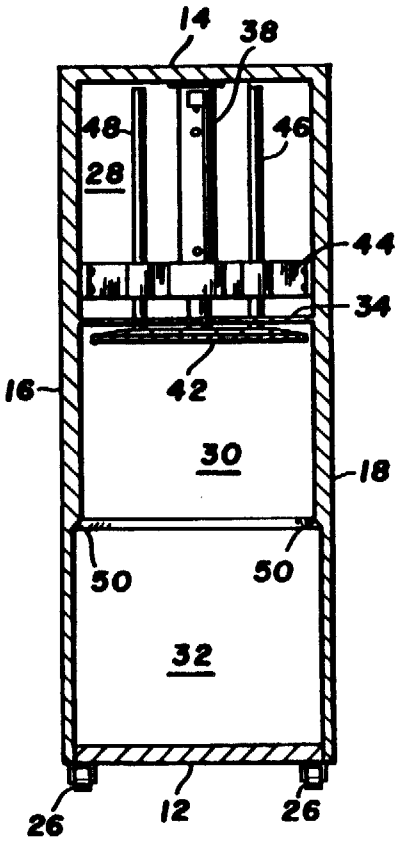
FIG. 3 is a front cross-sectional view taken along the line and in the direction of the arrows 3—3 in FIG. 2.
Figure 2:
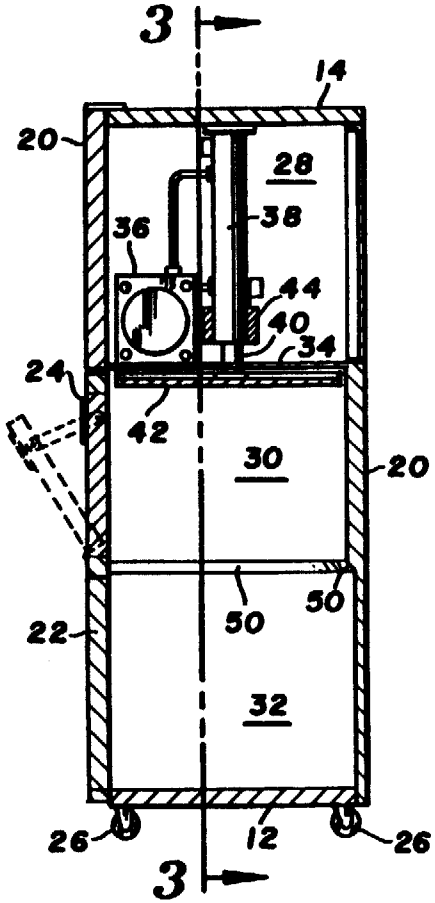
FIG. 2 is a side cross-sectional view taken along the lines and in the direction of the arrows 2—2 in FIG. 1.

Next, with reference to FIG. 2, it can be seen that the interior of the cabinet 10 is effectively and functionally divided into three compartments or volumes. Specifically, the so-called machine compartment is identified by numeral 28, the trash receiving compartment by numeral 30 and the trash compacting compartment by numeral 32. Dividing the machine compartment 28 from the intermediate trash receiving compartment 30, is a mounting plate 34 on which is mounted a hydraulic pump 36, a hydraulic cylinder 38, and the various electrical and hydraulic controls for the system. Because the detail of these controls is immaterial to a full understanding of the present invention, little more need be said concerning them. However, it is to be noted that the piston 40 of the hydraulic cylinder 38 passes through an opening in the mounting plate 34 and affixed to the lower end thereof is a compaction plate or platen 42. With reference to FIG. 3, there is further shown a cross arm 44 which is also disposed in the machinery containing compartment 28 and which is affixed at opposed ends thereof to structural channels (not shown). The uppermost end of the cylinder 38 abuts and is fastened to a further horizontal structural member comprising the cabinet framework and the lower end thereof is suitably clamped to the cross arm 44. Furthermore, first and second guide rods 46 and 48 pass through suitable bushings in the cross arm 44 and through the mounting plate 34 and are secured at their lower ends to the compaction plate 42. Thus, when actuated, the piston 40 moves outwardly from its cylinder 38 causing the platen 42 to move downward through the trash receiving compartment 30 of the cabinet 10 for a predetermined distance into the compaction compartment 32. The guide rods 46 and 48 serve to maintain the platen 42 in a generally horizontal disposition during its entire travel.

Figure 4:
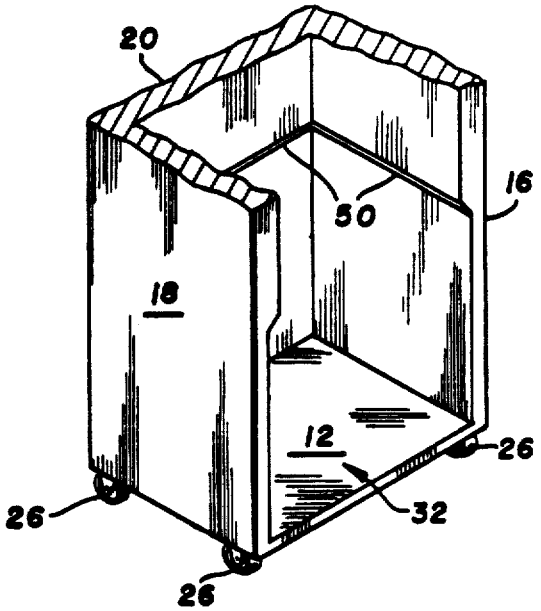
FIG. 4 is a partial perspective view of the inner surfaces of the side and rear panels comprising the cabinet of the present invention.

With reference to FIG. 4, it can be seen that the inside surfaces of the side panels 16 and 18 and the rear panel 20 are recessed inwardly in the area of the compaction compartment 32. That is to say, the side walls and rear wall of the cabinet have a greater thickness in the machine compartment zone 28 and the trash receiving zone 30 than they do in the trash compaction zone 32, the line of demarcation being identified by the beveled edges 50 formed in these panels.

Figure 5:
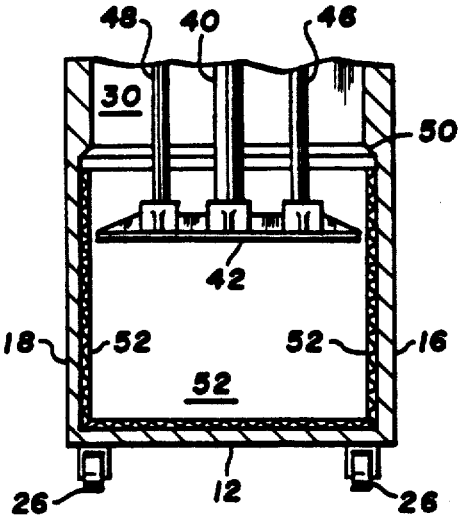
FIG. 5 is a partial frontal view illustrating the manner in which a cardboard container may be disposed within the compaction compartment of the cabinet.

The purpose of the recessed areas on the inner surfaces of the cabinet rear wall and side walls can best be seen from the partial cross-sectional view of FIG. 5. As is illustrated in this drawing, a corrugated cardboard box having vertical walls 52 of a predetermined thickness which is generally less than the depth of the recesses is adapted to be inserted into the compacting compartment 32 such that its vertical side walls are wholly contained within the recesses. The box, of course, is inserted into the cabinet through the open access door 22 hinged to the front of the cabinet.

The side edges of the platen 42 are of a length such that when disposed in the trash receiving compartment 30, only a slight clearance is maintained between the side edges of the platen and the inner surfaces of the walls of the cabinet. Thus, when the platen is moved to its lowermost disposition as indicated generally in FIG. 5, a predetermined clearance is maintained between the inner surfaces of the vertical side walls 52 of the container to thereby prevent interference between the platen and the container.

In operation, then, an empty trash receiving container in the form of an open top box is inserted into the compaction compartment 32 and refuse is deposited therein through the hinged door 24 formed in the access door 22. When a predetermined 25 level of trash is deposited, the operator actuates the pump mechanism 36 causing the hydraulic piston 40 to move out from its cylinder 38. In doing so, the compaction plate 42 traverses the compartment 30 and partially enters the compaction compartment 32. The loose refuse is thereby compacted and, again, the piston and platen raises to permit additional trash to be deposited. When the level of compacted trash in the removable container reaches a predetermined level or weight, the operator again opens the access door 22 and removes the trash filled carton. Because the carton is disposed in the recessed areas of the side and rear walls, it cannot interfere with the travel of the platen, which would otherwise damage the carton.

During operation of trash compactors of the type described, refuse including metal pieces such as tin cans jar lids, etc., may be thrown into the trash receiving compartment 30. It has been found from experience that where straight, non-recessed side walls are employed in the cabinet structure that there is a tendency for the crushed metal parts to wrap themselves about the side edges of the platen and to bind or jam against the side walls of the compactor cabinet. This can result in permanent damage to the machine or, at least, the need for servicing.

Figure 6:
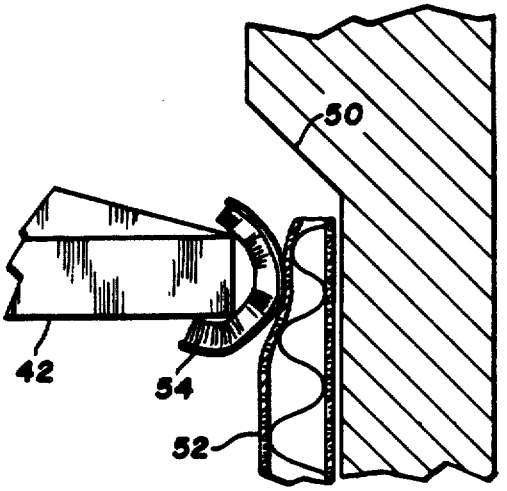
FIG. 6 is an enlarged partial view helpful in explaining the operation of the present invention.

This problem of jamming is minimized or eliminated in the cabinet of the present invention. As is illustrated in the enlarged partial view of FIG. 6, if during the compaction phase a tin can or other metal should wrap itself around the platen 42 as indicated by the metal piece 54 during the compaction step, it will tend to compress the corrugated container wall 52 and will not become as flat and wedged as it would otherwise do if the recess were not provided. Then, during the upward stroke of the compaction plate 42, the metal piece 54 will abut the beveled edge 50 defining the recess and the metal piece 54 will be stripped off from the platen 42 and will fall into the container. Thus, jamming of the compaction plate is prevented.

While the invention has been described with reference to a preferred embodiment, it is to be understood that various modifications and changes may be made thereto without departing from the spirit and scope of the following claims.

What is claimed is:

1. A cabinet for a trash compactor of the type including a frame defining a generally rectangular parallelepiped and having a base and top panel separated by two generally rectangular side panels and a rear panel, each having an inner and an outer planar surface, said panel being attached to said frame, said cabinet being functionally partitioned vertically into three separate compartments including an upper machinery containing compartment, an intermediate trash receiving compartment and a lower trash compacting compartment, *an said compactor being of the type having a generally planar horizontally disposed compaction plate mounted for upward and downward movement within said trash receiving and trash compacting compartments, said plate having peripheral edges in inwardly spaced relation to said inner planar surface of said side and rear panels within said tras*

*receiving and trash compacting compartments,* the improvement comprising:

(a) an inwardly extending planar recess formed in the inner surface of *each of* said side and rear panels [in the area] of said trash compacting compartment, said [recess] *recesses* being of a predetermined depth such that when a box-type container having vertical side walls of a predetermined thickness is inserted into said trash compacting compartment, at least three of said vertical side walls of said container are wholly contained within said recesses *and said recesses defining a stripping edge at the juncture between said trash receiving and trash compacting compartments, whereby items of trash caught on said peripheral edges of said planar compaction plate will be stripped therefrom by said stripping edge as said compaction plate moves upwardly from said trash compacting compartment into said trash receiving compartment.*

2. The cabinet as in claim 1 and further including a front panel hingedly coupled to a forward vertical edge of one of said side panels and providing an access door to said trash compacting compartment.

*3. A cabinet for a trash compactor of the type including a frame defining a generally rectangular parallelepiped and having a base and top panel separated by two generally rectangular side panels and a rear panel, each having an inner and an outer planar surface, said panels being attached to said frame, said cabinet being functionally partitioned vertically into three separate compartments including an upper machinery containing compartment, an intermediate trash receiving compartment and a lower trash compacting compartment, the improvement comprising:*

*a generally planar, horizontally disposed compaction plate mounted on power actuation means housed within said machinery containing compartment for upward and downward movement within said trash receiving and trash compacting compartments, said plate having an open and exposed top surface terminating at its peripheral extremities at side edges spaced inwardly from said inner planar surface of said side and rear panels and thus freely exposed such that items of trash tend to become wrapped around said freely exposed side edges and carried up and down on said plate; and*

*an inwardly extending planar recess formed in the inner surfaces of each of said side and rear panels of said trash compacting compartment, each of said recesses being of a predetermined depth such that when a box-type container having vertical side walls of a predetermined thickness is inserted into said trash compacting compartment, at least three of said vertical side walls of said container are wholly contained within said recesses, and said recesses joining said inner surfaces of said trash receiving compartment and said trash compacting compartment along a line of demarcation therebetween defining a stripping edge, whereby upon the upward movement of said compaction plate from said trash compacting compartment into said trash receiving compartment any items of trash wrapped around said freely exposed side edges will be stripped off said compaction plate by said stripping edge, thereby avoiding jamming of said compaction plate.*

*4. A trash compactor of the type having a vertically oriented cabinet defining a generally rectangular parallelepiped having a base and a top panel, opposed, generally rectangular side panels, and a rear panel, with at least said side and rear panels having an inner and an outer planar surface, said cabinet being functionally partitioned vertically into three separate compartments including an upper machinery containing compartment, an intermediate trash receiving compartment and a lower trash compacting compartment, and comprising:*

*a generally planar, horizontally disposed compaction plate mounted on power actuation means for upward and downward movement within said trash receiving and trash compacting compartments, said plate having side edges around its peripheral spaced inwardly from said inner planar surface of said side and rear panels and defining a clearance space therebetween within said trash receiving compartment and said trash compacting compartment, said side edges joining freely exposed top and bottom surfaces of said plate around which items of trash tend to become wrapped and carried up and down on said plate; and*

*an inwardly extending planar recess formed in the inner surfaces of each of said side and rear panels of said trash compacting compartment, said recesses being of a predetermined depth such that when a box-like container having vertical side walls of a predetermined thickness is inserted into said trash compacting compartment, at least three of said vertical side walls of said container are wholly contained within said recesses, and said recesses defining a stripping edge which contacts and strips items of trash from said peripheral edges of said compaction plate as said compaction plate moves upwardly past said recesses.*

*5. The trash compactor as defined in claim 4 and further including a front panel hingedly coupled to a forward vertical edge of one of said side panels and providing an access door to said trash compacting compartment.*

*6. The trash compactor as defined in claim 4 wherein:*

*the side edges of said compaction plate are spaced laterally inwardly a predetermined distance from said inner surfaces of said side and rear panels within said trash receiving compartment to maintain a clearance space therebetween as said compaction plate moves upwardly and downwardly within said trash receiving compartment.*

*7. The trash compactor as defined in claim 4 wherein:*

*said power actuation means is secured to the top of said compaction plate; and*

*a plurality of vertically extending guide rods are secured to said compaction plate, said guide rods extending through bushing means supported within said machinery containing compartment of said cabinet and serving to guide said compaction plate during its upward and downward movement and to maintain said plate in a generally horizontal disposition.*

* * * * *